(12) United States Patent
Omote et al.

(10) Patent No.: US 10,295,816 B2
(45) Date of Patent: May 21, 2019

(54) SURGICAL MICROSCOPE

(71) Applicant: MITAKA KOHKI CO., LTD., Tokyo (JP)

(72) Inventors: Shinpei Omote, Tokyo (JP); Masakazu Nakamura, Tokyo (JP); Masao Doi, Tokyo (JP)

(73) Assignee: MITAKA KOHKI CO., LTD., Tokyo (JP)

(*) Notice: Subject to any disclaimer, the term of this patent is extended or adjusted under 35 U.S.C. 154(b) by 28 days.

(21) Appl. No.: 15/474,023

(22) Filed: Mar. 30, 2017

(65) Prior Publication Data

US 2017/0293132 A1    Oct. 12, 2017

(30) Foreign Application Priority Data

Apr. 11, 2016    (JP) .................................. 2016-078647

(51) Int. Cl.
| | |
|---|---|
| *G02B 21/36* | (2006.01) |
| *G02B 27/12* | (2006.01) |
| *G02B 25/00* | (2006.01) |
| *G02B 21/00* | (2006.01) |
| *G02B 21/02* | (2006.01) |
| *G02B 5/04* | (2006.01) |

(52) U.S. Cl.
CPC ............. *G02B 21/361* (2013.01); *G02B 5/04* (2013.01); *G02B 21/0012* (2013.01); *G02B 21/02* (2013.01); *G02B 25/001* (2013.01); *G02B 25/004* (2013.01); *G02B 25/007* (2013.01); *G02B 27/126* (2013.01)

(58) Field of Classification Search
CPC ...... G02B 21/20; G02B 21/22; G02B 21/361; G02B 21/0012; G02B 21/02; G02B 25/001; G02B 27/126
USPC .......................................... 359/363, 372–378
See application file for complete search history.

(56) References Cited

U.S. PATENT DOCUMENTS

| | | | | |
|---|---|---|---|---|
| 4,710,000 A * | 12/1987 | Spitznas | ................ | G02B 21/22 351/205 |
| 4,723,842 A * | 2/1988 | Twisselmann | ......... | A61B 3/135 359/372 |
| 6,384,968 B1* | 5/2002 | Ito | ............................ | G02B 7/20 359/385 |
| 6,396,627 B1* | 5/2002 | Tachihara | .............. | G02B 21/22 348/42 |
| 2006/0012854 A1* | 1/2006 | Sander | ................... | G02B 21/22 359/368 |

(Continued)

FOREIGN PATENT DOCUMENTS

JP         2000-338412        12/2000

*Primary Examiner* — Frank G Font
(74) *Attorney, Agent, or Firm* — Greenblum & Bernstein, P.L.C.

(57) ABSTRACT

A surgical microscope employs a pentaprism beam splitter as a branching unit to branch each beam passed through variable power optical systems into a first beam and a second beam, the first beam being horizontally reflected for an eyepiece unit, the second beam being vertically transmitted for an imaging device. The pentaprism alone is capable of simultaneously conducting reflection to provide an erect image and transmission to provide a photographing image, thereby reducing the number of optical parts in a microscope body of the surgical microscope.

4 Claims, 4 Drawing Sheets

(56) References Cited

U.S. PATENT DOCUMENTS

| | | | | |
|---|---|---|---|---|
| 2011/0032335 A1* | 2/2011 | Sander | ............. | G02B 21/025 |
| | | | | 348/46 |
| 2011/0299174 A1* | 12/2011 | Obrebski | ............. | G02B 15/04 |
| | | | | 359/672 |
| 2013/0308198 A1* | 11/2013 | Erdogan | ............. | G02B 27/126 |
| | | | | 359/640 |
| 2014/0111866 A1* | 4/2014 | Hamar | ............. | G02B 27/126 |
| | | | | 359/638 |
| 2015/0370077 A1* | 12/2015 | Zuo | ............. | G02B 27/145 |
| | | | | 359/638 |

* cited by examiner

SURGICAL MICROSCOPE

This patent application claims the benefit of priority under 35 U.S.C. 119(a) to Japanese Patent Application No. 2016-078647 filed on Apr. 11, 2016 whose disclosed contents are cited herein.

BACKGROUND OF THE INVENTION

1. Field of the Invention

The present invention relates to a surgical microscope.

2. Description of Related Art

A surgical microscope includes a microscope body and an eyepiece unit. The microscope body incorporates an objective lens, and above the objective lens, a left-and-right pair of variable power lenses. The variable power lenses pass two systems of light beams, which are horizontally reflected by reflection units, taken out of the microscope body, and introduced into the eyepiece unit.

If the reflection units to horizontally reflect the beams in the microscope body are simple mirrors or prisms, the reflection units reflect an image only once to provide an inverted image. To avoid this, an effective way is to provide the microscope body with a pentaprism that alone is able to carry out two times of reflection. With the pentaprism, the microscope body is able to provide an erect image, and therefore, is able to reduce the number of optical parts to be installed in the eyepiece unit and improve compatibility with eyepiece units of other manufacturers.

To photograph an image that is being observed on the eyepiece unit, beams passed through the variable power lenses of the microscope body must be branched and guided to an imaging device. To achieve this, the microscope body needs optical parts such as beam splitters in addition to the pentaprism. A related art is, for example, Japanese Unexamined Patent Application Publication No. 2000-338412 (Patent Literature 1).

A surgical microscope of the related art employs pentaprisms and needs additional optical parts such as beam splitters if photographing an image that is being observed with the surgical microscope. This increases the number of parts in the surgical microscope and complicates an internal structure thereof.

SUMMARY OF THE INVENTION

In consideration of the problems of the related art, the present invention provides a surgical microscope capable of outputting an erect image to an eyepiece unit and branching a beam for photographing, without increasing the number of internal optical parts.

According to a first aspect of the present invention, the surgical microscope includes a microscope body, an eyepiece unit, and an imaging device. The microscope body at least includes an objective optical system having a vertical optical axis, a pair of variable power optical systems each having an optical axis in parallel with the optical axis of the objective optical system, and a branching unit to branch each beam passed through the variable power optical systems into first and second beams, the first beam being horizontally reflected by the branching unit, the second beam being vertically transmitted through the branching unit. The eyepiece unit is attached to the microscope body, to receive the first beam from the microscope body. The imaging device is attached to or incorporated in the microscope body, to receive the second beam. The branching unit is a pentaprism beam splitter.

DESCRIPTION OF PREFERRED EMBODIMENTS

Figure 1:
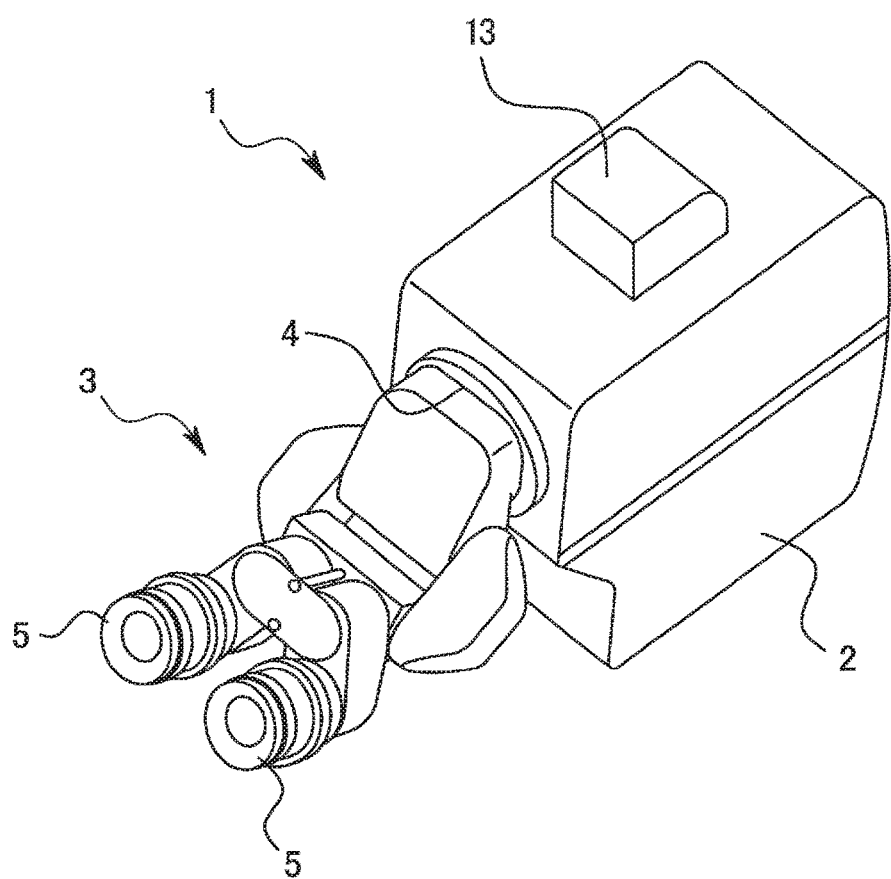
FIG. 1 is a perspective view illustrating a surgical microscope according to an embodiment of the present invention.
Figure 2:
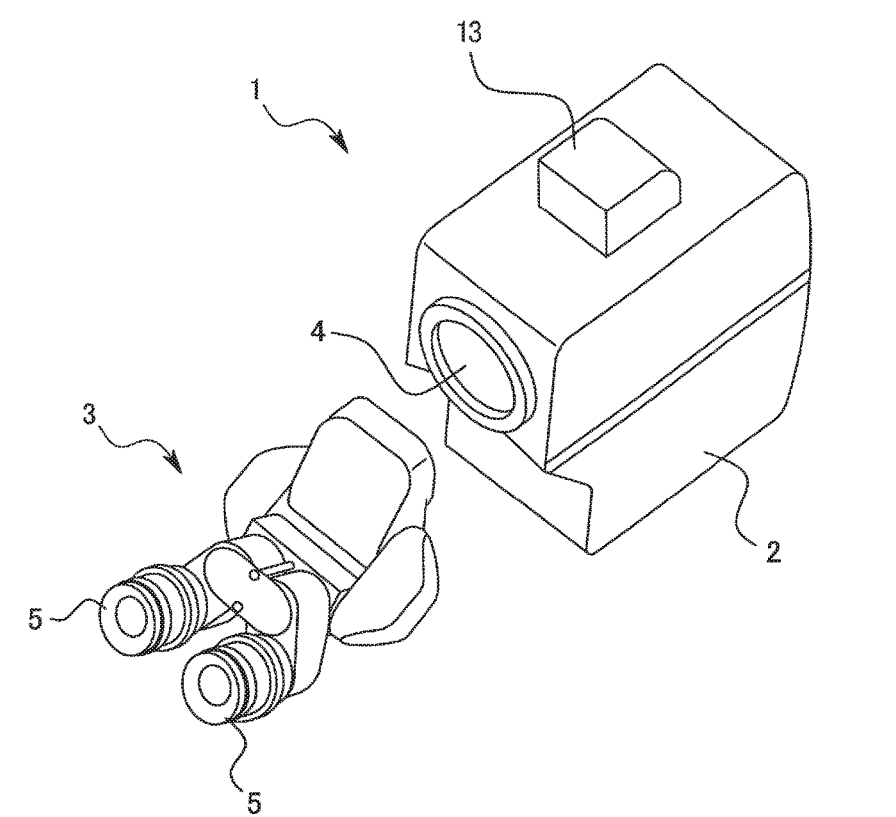
FIG. 2 is a perspective view illustrating the surgical microscope with an eyepiece unit thereof being separated.
Figure 3:
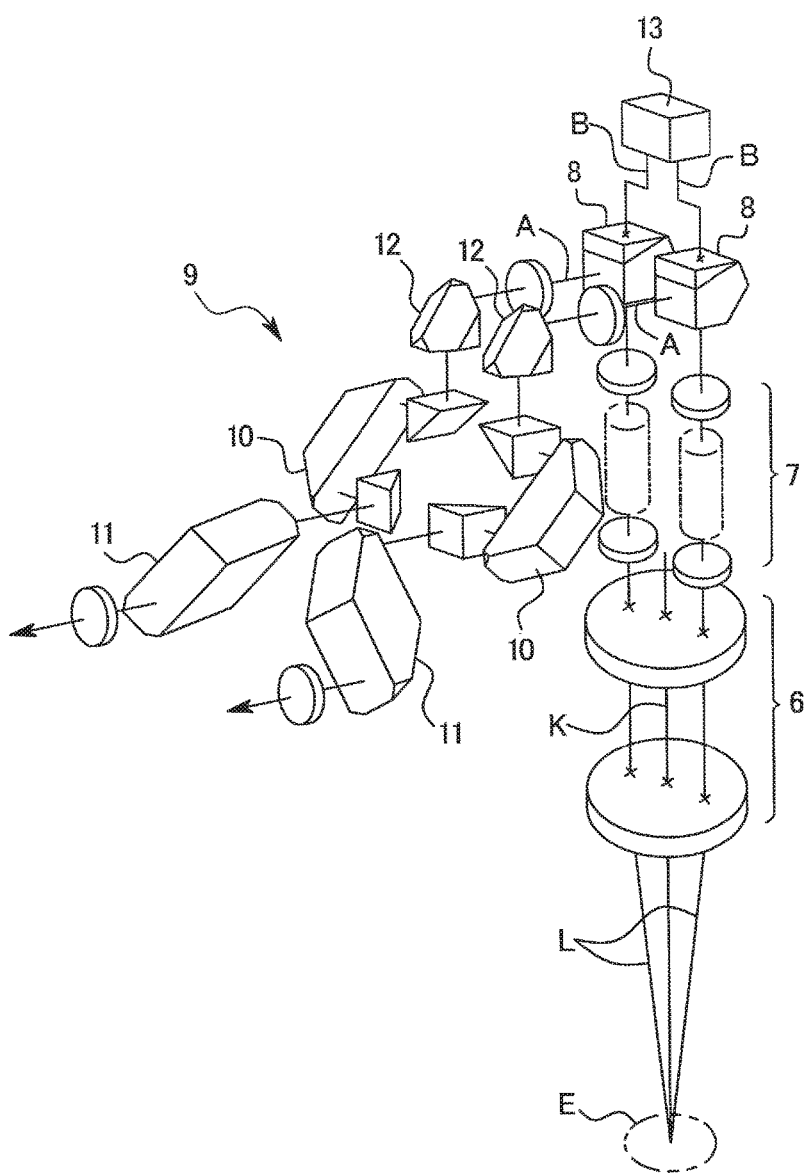
FIG. 3 is a perspective view illustrating an optical structure of the surgical microscope.
Figure 4:
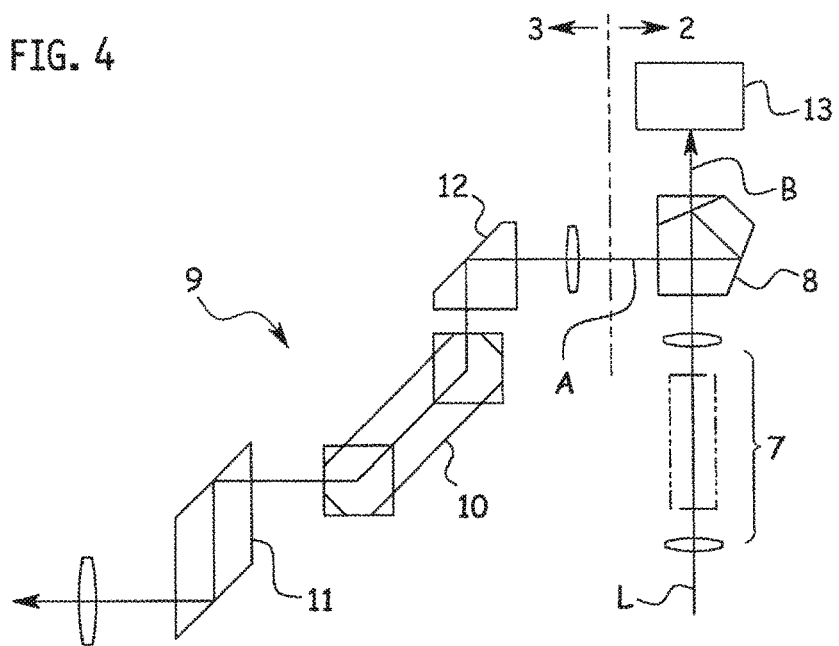
FIG. 4 is a side view illustrating an eyepiece optical system of the surgical microscope.
Figure 5:
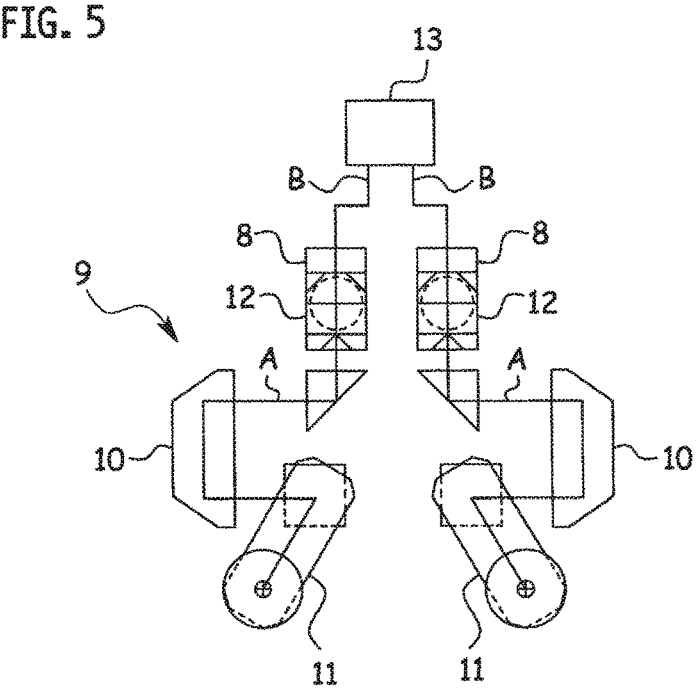
FIG. 5 is a front view illustrating the eyepiece optical system.

A surgical microscope according to an embodiment of the present invention will be explained with reference to FIGS. 1 to 5.

The surgical microscope 1 is supported at a front end of an arm of a stand unit (not illustrated). Within the range of the arm, the surgical microscope 1 is movable to an optional position, and at the optional position, can be oriented to an optional direction.

The surgical microscope 1 includes a microscope body 2 and an eyepiece unit 3. The eyepiece unit 3 is attached to a light port 4 formed on a vertical front face of the microscope body 2. The eyepiece unit 3 is configured so that eyepieces 5 are movable up and down and a pupil distance is adjustable.

Inside the microscope body 2, an objective optical system 6 defines a vertical optical axis K. The objective optical system 6 receives light L from a surgical field E. A bottom face of the microscope body 2 has a light intake (not illustrated) to receive the light L from the surgical field E.

Above the objective optical system 6, two variable power optical systems 7 are arranged. The variable power optical systems 7 each defines an optical axis in parallel with the optical axis K of the objective optical system 6. The variable power optical systems 7 pass the light L and provide beams L of a required magnification. The beams L are separated from each other within the range of the objective optical system 6 to realize binocular parallax for three-dimensional observation.

Above each of the variable power optical systems 7, a pentaprism beam splitter 8 serving as a branching unit is arranged to branch the beam L into a first beam A that is horizontally reflected and a second beam B that is transmitted as it is upward.

The first beam A is reflected two times by the pentaprism beam splitter 8 and is directed in a horizontal direction orthogonal to the optical axis of the variable power optical system 7. Due to this, an erect image is outputted from the light port 4 of the microscope body 2.

The first beam A from the microscope 2 is introduced into an eyepiece optical system 9 in the eyepiece unit 3. The eyepiece optical system 9 includes a plurality of prisms and lenses among which a pair of Dove prisms 10 are for adjusting up-down angles and a pair of rhomboid prisms 11 are for adjusting a pupil distance.

At a part to receive the first beam A in the eyepiece optical system 9, an Amici prism 12 is arranged. The Amici prism 12 changes an optical path by 90 degrees and carries out up-down and left-right inversions to maintain an erect image. Arranging the Amici prism 12 in each eyepiece optical path results in reducing the number of parts of the variable power optical systems 7.

The second beams B transmitted through the pentaprism beam splitters 8 are introduced into an imaging device 13 attached to a top face of the microscope body 2. The imaging device 13 includes imaging elements such as CCD image sensors to photograph the surgical field E observed with the eyepieces 5 and provide a left-and-right pair of electronic images having binocular parallax. These electronic images are displayed on a display unit and are stereoscopically observed through special glasses.

According to the embodiment mentioned above, each pentaprism beam splitter 8 is simultaneously capable of reflecting an erect image and transmitting a photographing image, thereby reducing the number of optical parts in the microscope body 2.

Although the embodiment mentioned above attaches the imaging device 13 to the top face of the microscope body 2, the imaging device 13 may be arranged inside the microscope body 2.

In summary, the first aspect of the present invention employs the pentaprism beam splitter as a branching unit in the microscope body, to split by reflection a beam passed through each variable power optical system into a horizontal first beam. The first beam provides an erect image because the first beam is reflected twice in the pentaprism beam splitter. Accordingly, the first beam can be introduced as it is into the eyepiece unit. Remaining part of the beam passed through the variable power optical system is transmitted as it is through the pentaprism beam splitter as a second beam, which is introduced into the imaging device. In this way, each pentaprism beam splitter simultaneously conducts reflection for providing an erect image and transmission for providing a photographing image, thereby reducing the number of optical parts in the microscope body.

A second aspect of the present invention arranges the Amici prism in the eyepiece unit. The Amici prism bends the first beam by 90 degrees and reflects the same twice, thereby reducing the number of parts in the eyepiece unit.

What is claimed is:

1. A surgical microscope comprising:
   a microscope body including:
      an objective optical system defining a vertical optical axis;
      a pair of variable power optical systems each defining an optical axis in parallel with the vertical optical axis of the objective optical system; and
      a branching unit configured to branch light beams passing through each of the variable power optical systems into a first beam and a second beam, the first beam being horizontally reflected by the branching unit, and the second beam being vertically transmitted through the branching unit;
   an eyepiece unit attached to the microscope body and configured to receive the first beam from the microscope body; and
   an imaging device provided in the microscope body and configured to receive the second beam, wherein
   the branching unit is a pentaprism beam splitter.

2. The surgical microscope of claim 1, wherein an Amici prism is arranged in an optical path in the eyepiece unit.

3. The surgical microscope of claim 2, wherein a Dove prism and a rhomboid prism are arranged in the optical path in the eyepiece unit such that the Dove prism is arranged between the Amici prism and the rhomboid prism.

4. The surgical microscope of claim 2, wherein the Amici prism changes an optical path of each of the first beam and the second beam by 90 degrees and carries out up-down and left-right inversions to maintain an erect image to be viewed through the eyepiece unit.

* * * * *